Nov. 16, 1926.

H. SHIMIDZU

DRY BATTERY

Filed Jan. 28, 1926

1,607,567

Inventor

Hanbey Shimidzu
Connolly Bros. Attys

Patented Nov. 16, 1926.

1,607,567

UNITED STATES PATENT OFFICE.

HANBEY SHIMIDZU, OF YOTSUYA-KU, TOKYO-SHI, JAPAN.

DRY BATTERY.

Application filed January 28, 1926, Serial No. 84,505, and in Japan August 13, 1925.

This invention has relation to dry batteries, and has for its primary object to provide a safety cell which will be proof against the formation of any electric short circuits, which in other batteries of the type have occurred frequently from careless handling or unavoidable accident.

A further object is to produce a dry battery having inner electrical terminals which will be firm and steady against any outer mechanical forces. A still further object is to simplify the construction of the dry battery and to improve its appearance.

Heretofore, the electrical terminals of dry batteries have been so arranged as to project beyond the bodies of the cells and hence, if on account of careless handling, any electrical conductive material lies upon the terminals, there are formed electrical short circuits through such conductive material. And in previously constructed batteries, the projective terminals are not only liable to impinge against other objects, causing damage or shaking, but by reason of their construction take time and skill to connect with the leading wire.

According to the present invention, these defects are obviated, and the batteries rendered easier and safer to handle, as well as more efficient and durable.

In the accompanying drawing, forming part of this specification,

Figure 1:
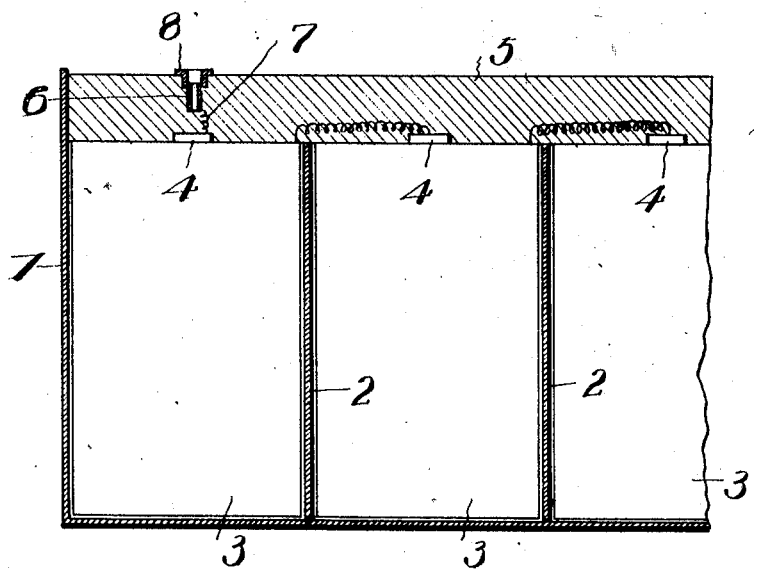
Fig. 1 is a cross sectional side view of part of a set of batteries in parallel connection and adapted for special use in wireless telephony.

Referring now more particularly to Figure 1, 1 designates the usual zinc casing; 2 are the partitions, i. e. the zinc barriers which mark off one unit of the cells 3 from another in the casing. 4 are the carbon plates or rods; 5 is the asphalt or other sealing paste, and in such sealing layer, I bury the electric conductive tube which is the terminal of the anode carbon 4 and connected to said tube by the conducting wire 7. In the inner end of the opening or bore of the terminal tube 6, an ebonite or other non-electric conductive ring or collar 8, is inserted, to prevent the collapse of the edge of the asphalt opening in which the collar 8 is seated.

Figure 2:
Fig. 2 is a cross sectional view of a terminal connection plug fitted to the batteries shown in Fig. 1.

For insertion in the terminal tube 6, there is provided a plug which is illustrated in Fig. 2, its contact piece 9, being formed with slits 10 to provide elasticity and ensure close electrical contact with the said tube 6. The contact piece 9 is connected to a leading wire 11. When the plug is inserted in the terminal tube 6, they will be kept tightly and securely in contact with each other, and the electric current will flow out by the leading wire without obstruction. And as the plug, furthermore, can be conveniently and easily taken out, this invention is particularly well adapted for use in wireless telephony, the dry batteries of which have more than two terminals, each terminal having to be carefully selected for use for A, B, or C batteries. For wireless use it is important that all of these terminals should be, and according to my invention, are embedded in the sealing asphalt layer 5.

The form and construction of the terminal 6 are variable, for example. the bore of the tube may be screw-threaded or a simple solid stem may be used instead of the tube.

In the former case a suitable screw plug would be used to make connection, instead of a slitted piece, and in the latter case a fitted tube may be combined as the plug.

I claim:

1. A dry battery having metallic terminals embedded in the sealing medium wholly below the surface of the latter, and having a collar of insulating material embedded in the sealing medium above such terminals and adapted for the insertion of plugs therethrough into contact with the metallic terminals.

2. A dry battery having tubular metallic terminals embedded in the sealing medium wholly below the surface of the latter and adapted for the reception of connecting plugs and having insulating collars embedded in said sealing medium above said terminals and adapted for the passage of the plugs therethrough to the metallic terminals.

In testimony whereof, I have signed my name to this specification at Tokyo, Japan, this 30th day of Dec., 1925.

HANBEY SHIMIDZU.